Figure 1:
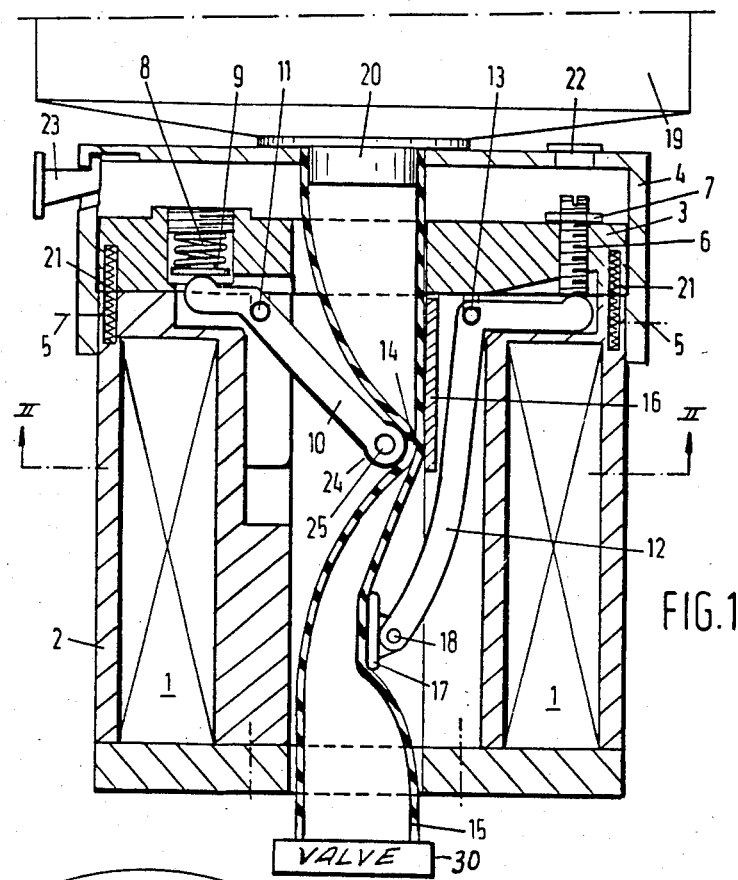

United States Patent [19]

van Overbruggen

[11] Patent Number: 4,601,411
[45] Date of Patent: Jul. 22, 1986

[54] ELECTROMAGNETIC METERING DEVICE HAVING ASYMMETRICAL LEVERS

[75] Inventor: Gerardus J. J. van Overbruggen, Vianen, Netherlands

[73] Assignee: Douwe Egberts Koninklijke Tabaksfabriek-Koffiebranderijen-Theehandel, Utrecht, Netherlands

[21] Appl. No.: 548,773

[22] Filed: Nov. 4, 1983

[30] Foreign Application Priority Data

Dec. 16, 1982 [NL] Netherlands ............... 8204867

[51] Int. Cl.⁴ ........................... G01F 11/02
[52] U.S. Cl. ..................... 222/207; 222/214; 222/504
[58] Field of Search ......... 222/214, 504, 207, 209, 222/185, 491, 494, 438, 434, 445, 446, 448, 449; 251/65

[56] References Cited

U.S. PATENT DOCUMENTS

| 2,903,165 | 9/1959 | Hanson et al. | 222/504 X |
| 4,256,242 | 3/1981 | Christine | 222/214 X |
| 4,393,982 | 7/1983 | Kuckens | 222/214 X |
| 4,394,938 | 7/1983 | Frassanito | 222/214 X |
| 4,463,876 | 8/1984 | Swallert | 222/214 X |

FOREIGN PATENT DOCUMENTS

| 045830 | 2/1982 | European Pat. Off. | 222/214 |
| 0067466 | 12/1982 | European Pat. Off. | |
| 2434629 | 2/1975 | Fed. Rep. of Germany | 222/504 |
| 8231971 | 4/1983 | Fed. Rep. of Germany | |
| 1387349 | 3/1975 | United Kingdom | |

Primary Examiner—Joseph J. Rolla
Assistant Examiner—Kevin P. Shaver
Attorney, Agent, or Firm—Cushman, Darby & Cushman

[57] ABSTRACT

A device for metering liquids with an electromagnet having a recess extending in the axial direction and adapted to receive a metering hose with an outlet valve, the electromagnet being provided with an armature perpendicular to the axis, and a first lever, upon an axial movement of the armature when the electromagnet is energized, closing the metering hose arranged in the recess completely at a first location, and a second lever, upon a further axial movement of the armature, exerting on the metering hose a pressure deforming substantially in the radial direction at a second location between the first location and the outlet valve.

2 Claims, 3 Drawing Figures

ELECTROMAGNETIC METERING DEVICE HAVING ASYMMETRICAL LEVERS

Applicants' German Gebrauchsmuster No. G 82 31 971.5 discloses a device for metering liquids comprising an electromagnet with a bore adapted to receive a metering hose with an outlet valve, the electromagnet being provided with an armature perpendicular to the axis and a first and a second lever adapted to convert an axial movement of the armature into a substantially radial movement when the electromagnet is energized.

Normally, in the embodiment described therein the metering in question will require a metering hose which, in addition to the valve at the outlet, must have a second valve located at some distance above the first. The lever or levers then press on the part of the hose situated between the two valves in order to effect the metering. The upper valve has some drawbacks. In the first place, it must be highly sensitive, as the part of the hose between the two valves is filled, after each dosage, by means of spring-back of the elastic wall. A second drawback is that the hose when put into use must be filled completely from the liquid reservoir to which the metering hose is attached, whereby the air must be displaced entirely. This can be done in two ways: either by filling it during production and filling of the reservoir, or by means of a special valve structure (as described in applicants' European patent application No. 82 200 635.9, FIG. (6). Both methods involve an additional complication in the production of the reservoir and the metering hose.

It is an object of the present application to make the second valve superfluous while retaining the advantages of the device according to above-mentioned Gebrauchsmuster No. G 82 31 971.5.

According to the present invention there is provided a device for metering liquids comprising an electromagnet having a recess extending in the axial direction and adapted to receive a metering hose with an outlet valve, the electromagnet being provided with an armature perpendicular to the axis, and a first and a second lever adapted to convert an axial movement of the armature into a substantially radial movement when the electromagnet is energized, characterized in that upon an axial movement of the armature the first lever closes a hose arranged in the recess completely at a first location and upon a further axial movement of the armature the second lever exerts on this metering hose a pressure deforming substantially in the radial direction at a second location between the first location and the outlet valve.

A possible embodiment of the device according to the application will now be described with reference to the accompanying FIGS. 1 and 2.

The longitudinal section of FIG. 1 shows the situation when the electromagnet which contains a metering hose is energized.

Figure 2:
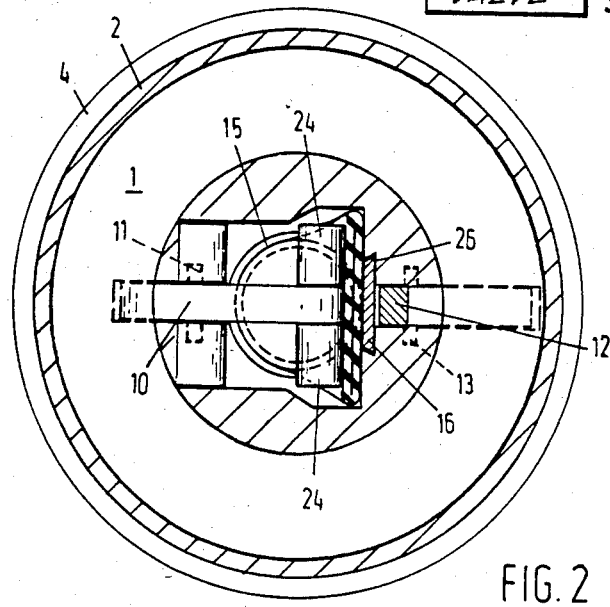

FIG. 2 is a cross-sectional view taken on the lines II—II of FIG. 1.

At 1 is shown the coil of the electromagnet, which coil is contained in a housing 2 of ferromagnetic material. The armature is shown at 3. The armature is covered by a cover 4, which is attached to the housing 2 at 5. The armature 3 is provided with an adjusting screw 6 with a lock nut 7. Contained in a recess of the armature is a spring 8 which acts upon a pressure plate 9 attached thereto. An upper lever 10 is arranged for rocking movement about a pin 11 secured to the housing 2. This lever 10 is provided at its end with two rollers 24 rotatable about a pin 25. A lower lever 12 is arranged to turn about a pin 13, likewise secured to the housing 2. Shown at 14 is the location of a hose 15 where it is closed by the lever 10 owing to the attraction of the armature 3. The hose 15 is closed at 14 against a hold-down plate 16 which is inserted into the housing 2 through slots 26. The spring 8 makes it possible that when the hose is closed at 14 the armature can be attracted further. The adjusting screw 6 thereby strikes the short crank of the lever 12. The long crank of this lever 12 is, for the special case indicated here, provided with an ejection plate 17 pivoting about a pin 18 attached to the long crank of 12. Shown at 19 is a reservoir with liquid, which is connected to the hose 15 through a rigid connecting member 20. This hose is provided at its lower end with a one-way valve 30 opening outwards. For adjusting the dosage a cap 22 may be removed from cover 4, and then the adjusting screw 6 may be turned after the lock nut 7 has been loosened.

Shown at 21 are return springs with which the armature is returned to its position of rest when the electromagnet is not energized. The embodiment described before is suitable for metering the volume desired per dosage by energizing the electromagnet one or a few times. In pulse-metering as described in applicants' European patent application 82 200 635.9, many small amounts of liquid must be rapidly ejected per unit of consumption. The ejection plate 17 then becomes superfluous. In this connection it is also important that the radial movement of the tip of the lever 10 at 14 is kept small. This is possible when it is shaped so that in the position of rest, i.e. when the electromagnet is not energized and the armature is therefore not attracted, the lever already compresses the hose to a substantial extent owing to a limitation of the stroke of the armature in upward direction. This limitation may be obtained, e.g., by means of a wedge 23. When the hose is introduced, this wedge is in the position indicated. After the hose has been introduced, the wedge is pushed inwards whereby it becomes lodged.

To facilitate the closing of the hose a metering hose may be used which at 14 has a smaller diameter and/or wall thickness than has the part where the pressure is exerted by the lever 12, for in the latter part the hose must become filled through the elasticity of the wall.

Figure 3:
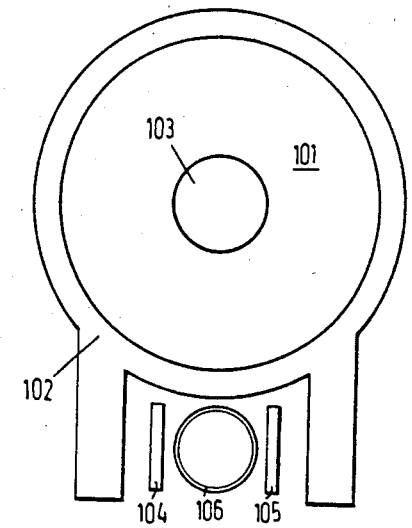

In the above, an embodiment is described in which the electromagnet has a central bore for receiving the metering hose. Other embodiments are of course possible, for example one as schematically shown in FIG. 3 in cross section perpendicular to the long axis. In it, the coil is designated by 101, the horseshoe-shaped housing of ferromagnetic material by 102, and a core, likewise of ferromagnetic material, by 103. Between the "legs" of the horseshoe-shaped electromagnet the levers are indicated by 104 and 105, the hose being shown at 106. The armature has the same horseshoe-shape as the electromagnet.

What I claim:
1. A device for metering liquids comprising:
a housing;
an electromagnet mounted in said housing, said electromagnet having a bore extending in an axial direction and an armature mounted adjacent to the electromagnet and perpendicular to said bore for movement in said axial direction in response to actuation of said electromagnet;

a metering hose extending through said bore in said axial direction and having an outlet valve;

a first lever pivotably mounted in said housing and pivoted by said axial movement of said armature to engage and completely close said hose at a first location within the bore; and a second lever mounted in said housing pivoted by said axial movement of said armature to engage and deform said hose at a second location between said first location and said outlet valve.

2. A device as in claim 1 wherein said hose has a soft portion at said first location and a stiff portion at said second location.

* * * * *